United States Patent
Millar (10) Patent No.: US 11,202,416 B2
(45) Date of Patent: Dec. 21, 2021

(54) SYSTEMS AND METHODS FOR TRACKING SEEDS IN AN ASSEMBLY LINE GROW POD

(71) Applicant: Grow Solutions Tech LLC, Lehi, UT (US)

(72) Inventor: Gary Bret Millar, Highland, UT (US)

(73) Assignee: Grow Solutions Tech LLC, Vineyard, UT (US)

( * ) Notice: Subject to any disclaimer, the term of this patent is extended or adjusted under 35 U.S.C. 154(b) by 601 days.

(21) Appl. No.: 15/983,799

(22) Filed: May 18, 2018

(65) Prior Publication Data
US 2018/0359968 A1    Dec. 20, 2018

Related U.S. Application Data

(60) Provisional application No. 62/519,320, filed on Jun. 14, 2017, provisional application No. 62/519,660, filed on Jun. 14, 2017.

(51) Int. Cl.
*A01G 27/00* (2006.01)
*A01G 31/04* (2006.01)
(Continued)

(52) U.S. Cl.
CPC ........... *A01G 27/003* (2013.01); *A01G 9/006* (2013.01); *A01G 9/085* (2013.01); *A01G 9/088* (2013.01); *A01G 9/247* (2013.01); *A01G 31/042* (2013.01)

(58) Field of Classification Search
CPC ...... A01G 31/042; A01G 9/088; A01G 9/085; A01G 9/143; A01G 27/003; A01G 9/006; A01G 9/247
See application file for complete search history.

(56) References Cited

U.S. PATENT DOCUMENTS 3,771,258 A * 11/1973 Charney .............. A01G 31/042
                                                    47/65
4,627,190 A * 12/1986 Little .................... A01G 9/085
                                                    221/211
(Continued)

FOREIGN PATENT DOCUMENTS

| CN | 104429882 B | 8/2016 |
| CN | 106441442 A | 2/2017 |

(Continued)

OTHER PUBLICATIONS

International Search Report and Written Opinion for PCT/US2018/033786 dated Oct. 8, 2018, 16 pages.

*Primary Examiner* — Tien Q Dinh
*Assistant Examiner* — Katelyn T Truong
(74) *Attorney, Agent, or Firm* — Dinsmore & Shohl LLP (57) ABSTRACT

A method for tracking seeds in an assembly line grow pod having a plurality of carts is provided. A target seed is deposited in a selected cell which is a part of a selected tray located in a selected cart travelling on an assembly line grow pod. A position of the target seed is tracked in the selected cell by determining the position of the target seed in the selected cart and determining a position of the selected cart in the assembly line grow pod. Sustenance is provided to the target seed including the selected cell. A growth factor of the target seed is determined in the selected cell. Upon determination that the growth factor of the target seed in the selected cell is below a predetermined threshold, supply of the sustenance provided to the selected cell is adjusted.

20 Claims, 9 Drawing Sheets

(51) Int. Cl.
*A01G 9/24* (2006.01)
*A01G 9/08* (2006.01)
*A01G 9/00* (2018.01)

(56) References Cited

U.S. PATENT DOCUMENTS

| | | |
|---|---|---|
| 6,150,158 A | 11/2000 | Bhide et al. |
| 2009/0126266 A1* | 5/2009 | Mulder .................... A01C 7/04 |
| | | 47/58.1 SE |
| 2009/0237212 A1* | 9/2009 | Hyde ....................... H04Q 9/00 |
| | | 340/10.1 |
| 2013/0104453 A1* | 5/2013 | Hassle .................... A01G 9/14 |
| | | 47/17 |
| 2014/0259920 A1 | 9/2014 | Wilson |
| 2016/0057942 A1* | 3/2016 | Ohshimo ............... G05B 15/02 |
| | | 700/90 |
| 2017/0265408 A1 | 9/2017 | McGowan et al. |
| 2019/0000019 A1* | 1/2019 | Alexander ............... A01G 9/02 |
| 2020/0012852 A1* | 1/2020 | Ding .................... A01G 25/167 |

FOREIGN PATENT DOCUMENTS

| | | |
|---|---|---|
| GB | 2121263 A | 12/1983 |
| TW | M448129 U | 3/2013 |
| WO | 2013/066254 A1 | 5/2013 |
| WO | 2014/066844 A2 | 5/2014 |
| WO | 2016/138075 A1 | 9/2016 |
| WO | 2017/024353 A1 | 2/2017 |

\* cited by examiner

SYSTEMS AND METHODS FOR TRACKING SEEDS IN AN ASSEMBLY LINE GROW POD

CROSS REFERENCE

This application claims the benefit of U.S. Provisional Application Ser. No. 62/519,320, entitled "SYSTEMS AND METHODS FOR SEED TRACKING IN A GROW POD," and 62/519,660, entitled "SYSTEMS AND METHODS FOR MEASURING GROWTH OF A PLANT IN A GROW POD," both of which have been filed on Jun. 14, 2017, and their disclosure of which are incorporated by reference in its entirety.

TECHNICAL FIELD

Embodiments described herein generally relate to systems and methods for tracking seeds in an assembly line grow pod and more specifically, to tracking the position and growth of a plurality of seeds in an assembly line grow pod.

BACKGROUND

While crop growth technologies have advanced over the years, there are still many problems in the farming and crop industry today. As an example, while technological advances have increased efficiency and production of various crops, many factors may affect a harvest, such as weather, disease, infestation, and the like. Additionally, while the United States currently has suitable farmland to adequately provide food for the U.S. population, other countries and future populations may not have enough farmland to provide the appropriate amount of food. Accordingly, there is a need to provide an organized plant grow pod system which facilitates a quick growing, small footprint, chemical free, low labor solution to growing microgreens and other plants for harvesting. At the same time, there is a need that the organized plant grow pod system may provide controlled environmental conditions (e.g., the timing and wavelength of light, pressure, temperature, watering, nutrients, molecular atmosphere, and/or other variables) and ensure that each plant or seed receives customized and selective care based on individual growth factors and parameters relevant to plants or seeds, in order to optimize plant growth and output.

SUMMARY

Systems and methods for tracking seeds in an assembly line grow pod to provide customized and individual care are described. One embodiment of a method includes a method for tracking seeds in an assembly line grow pod having a plurality of carts is provided. A target seed is deposited in a selected cell which is a part of a selected tray located in a selected cart travelling on an assembly line grow pod. A position of the target seed is tracked in the selected cell by determining the position of the target seed in the selected cart and determining a position of the selected cart in the assembly line grow pod. Sustenance is provided to the target seed including the selected cell. A growth factor of the target seed is determined in the selected cell. Upon determination that the growth factor of the target seed in the selected cell is below a predetermined threshold, supply of the sustenance provided to the selected cell is adjusted.

In another embodiment, a system for tracking seeds in an assembly line grow pod, incudes a plurality of carts travelling on a continuous track of an assembly line grow pod and a tray located on a selected cart and including a selected cell where a target seed is deposited. The tracking system further includes a seed sensor, a plurality of growth sensors, and a master controller. The seed sensor is arranged to communicate with the selected cart and detect a position of the target seed and the selected cart. The plurality of growth sensors is arranged to communicate with the selected cart and measure data relevant to growth of the target seed. The master controller is in communication with the seed sensor and the growth sensors and includes a processor and a memory for storing programs. The programs, upon execution by the processor, perform operations including (i) determining a first position of the target seed and a second position of the selected cart based on first data received from the seed sensor; (ii) identifying the target seed and retrieving plant growth information relevant to the target seed; (iii) providing sustenance relevant to the target seed based on the plant growth information to the selected cell; (iv) determining a growth factor of the target seed in the selected cell based on second data received from the plurality of growth sensors; and (v) upon determination that the growth factor of the target cell is below a predetermined threshold, adjusting an amount of sustenance based on the growth factor of the target seed.

In yet another embodiment, an assembly line grow pod system includes a tray located on a selected cart and including a selected cell where a target seed is deposited. The assembly line grow pod system further includes a seed sensor arranged to sense first data relating to a position of the selected cart and the target seed; a plurality of growth sensors arranged to sense second data relating to growth factors of the target seed; a plurality of output sensors arranged to sense environment factors relevant to growth of plants; and a master controller in communication with the seed sensor and the growth sensors and including a processor and a memory for storing programs, wherein the programs, upon execution by the processor, perform: operations including (i) determining a first position of the target seed and a second position of the selected cart based on first data received from the seed sensor; (ii) identifying the target seed and retrieving plant growth information relevant to the target seed; (iii) providing sustenance relevant to the target seed based on the plant growth information to the selected cell; (iv) determining a growth factor of the target seed in the selected cell based on second data received from the plurality of growth sensors; and (v) upon determination that the growth factor of the target cell is below a predetermined threshold, causing the selected tray to move the first position of the target seed within the selected cell, or within the tray.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include systems and methods for seed tracking in an assembly line grow pod. Some embodiments may be configured to individually place seeds into predetermined cells of a cart. The assembly line grow pod may include a grow sensor to monitor the growth and harvesting of the plants as plants travel along an assembly line in a grow pod. Similarly, seed sensors may be configured to determine a location of a particular seed on the assembly line grow pod. These embodiments may be configured to provide individual care to each cell and/or plant, based on measurements taken on the development and growth of the one or more plants in the cell. The systems and methods for seed tracking in an assembly line grow pod incorporating the same will be described in more detail, below.

Figure 1:
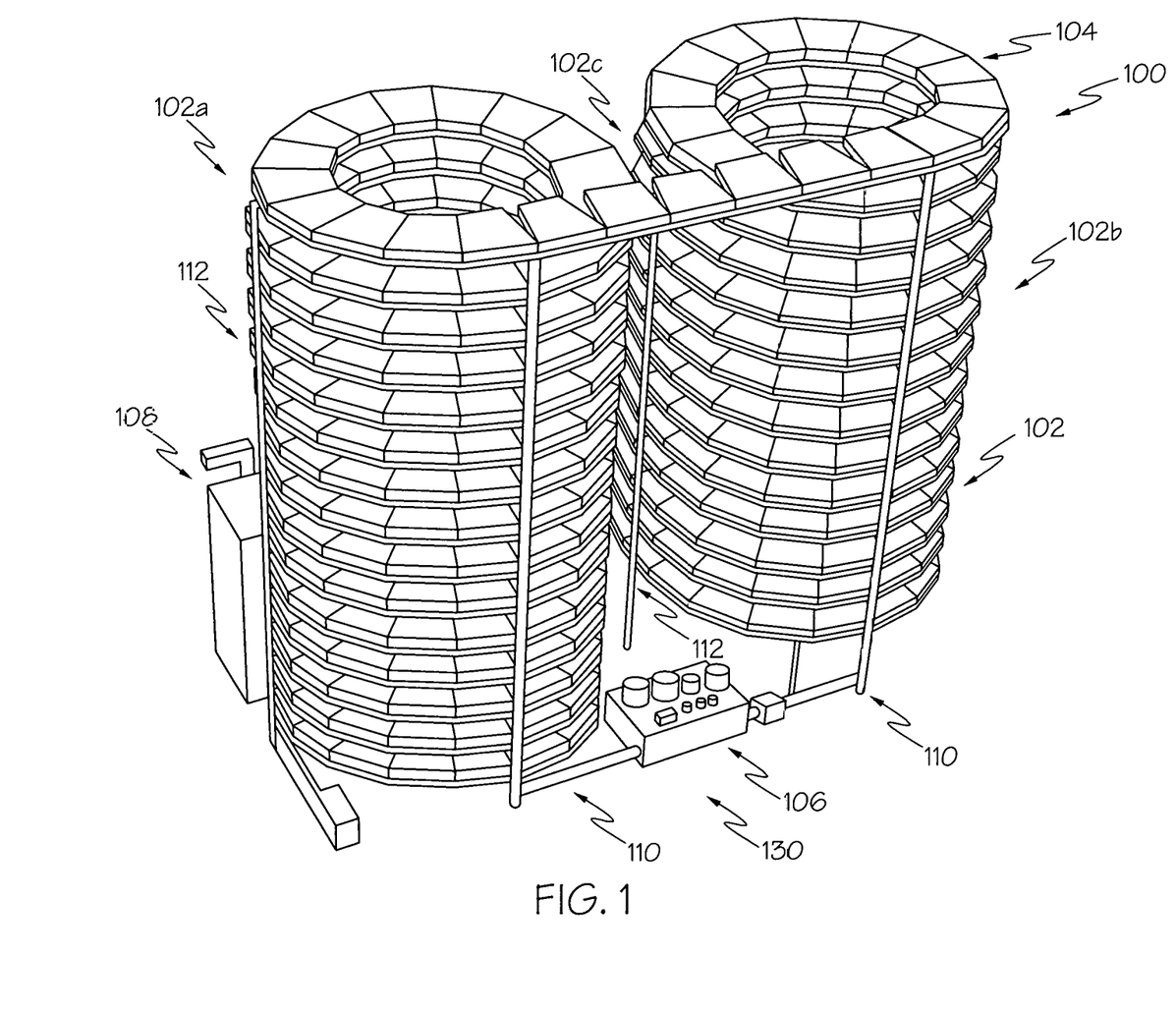
FIG. 1 depicts an assembly line grow house for seed tracking, according to embodiments described herein.

Referring now to the drawings, FIG. 1 depicts an assembly line grow pod 100 for seed tracking, according to embodiments described herein. As illustrated, the grow pod 100 may include a track 102 that holds one or more carts 104. The track 102 may include an ascending portion 102a, a descending portion 102b, and a connection portion 102c. The track 102 may wrap around (in a counterclockwise direction in FIG. 1) a first axis such that the carts 104 ascend upward in a vertical direction. The connection portion 102c may be relatively level (although this is not a requirement and is utilized to transfer carts 104 to the descending portion 102b. The descending portion 102b may be wrapped around a second axis (again in a counterclockwise direction in FIG. 1) that is substantially parallel to the first axis, such that the carts 104 may be returned closer to ground level.

While not explicitly illustrated in FIG. 1, the grow pod 100 may also include a plurality of lighting devices, such as light emitting diodes (LEDs). The lighting devices may be disposed on the track 102 opposite the carts 104, such that the lighting devices direct light waves to the carts 104 on the portion the track 102 directly below the lighting devices. In some embodiments, the lighting devices are configured to create a plurality of different colors and/or wavelengths of light, depending on the application, the type of plant being grown, and/or other factors. While in some embodiments, LEDs are utilized for this purpose, this is not a requirement. Any lighting device that produces low heat and provides the desired functionality may be utilized.

Also depicted in FIG. 1 is a master controller 106. The master controller 106 may include a computing device and various control modules for controlling various components of the assembly line grow pod 100 such as a nutrient dosing control module, a water distribution control module, etc. As an example, control modules for controlling a water distribution control module, a nutrient distribution control module, an air distribution control module, etc. may be included as part of the master controller 106 which may provide a modular control interface. The modular control interface of the master controller 106 enables removal, replacement, upgrade and expansion of each control module without changing or affecting the operations of other control modules, or shutting down the master controller 106 or other components of the assembly line grow pod 100.

In some embodiments, the master controller 106 may store a master recipe for plants that may dictate the timing and wavelength of light, pressure, temperature, watering, nutrients, molecular atmosphere, and/or other variables the optimize plant growth and output. For example, the master recipe dictates lighting requirements on the third day of a particular plant at the assembly line grow pod 100, different lighting requirements on the fourth day of the plant, etc. As another example, the master recipe dictates watering needs, nutrient feeds, etc. directed to plants carried on the carts at particular locations for a particular day counted from the date that plants are introduced into the assembly line grow pod 100. The master recipe is specific, extensive and customized to cover plants supported by the assembly line grow pod 100. By way of example only, the recipe may have instructions to assist 1500 carts simultaneously operating in the assembly line grow pod 100 and carrying diverse population of plants. In some embodiments, the master controller 106 may store specific recipes such as a watering recipe, a nutrient recipe, a dosage recipe, a wave recipe, a temperature recipe, a pressure recipe, etc.

In some embodiments, the master recipe may take any form of a structured set of data, a database, etc. such that data is organized into rows, columns, and table. Additionally, or alternatively, the master recipe may be structured to facilitate the storage, retrieval, modification, addition, and deletion of data through data processing operations.

In some embodiments, the master controller 106 reads information from the master recipe and adjust the information based on known locations of plants at the assembly line grow pod 100. For example, the master controller 106 may identify the plants location based on a cart identifier which is indicative of the growth stage of the plants in the assembly line grow pod 100. Once plants enter into the assembly line grow pod 100, plants move along the spiral tracks from the ascending side to the descending side until plants arrive at the harvest stage. Thus, the location of the carts carrying plants may indicate the growth stage of plants at the assembly line grow pod 100. Then, the master controller 106 may apply the master recipe relevant to the stage of the plants, such as lighting, watering, pressure, and/or wave requirements, specific to plants growing on the fourth day at the assembly line grow pod 100.

The master controller 106 processes the master recipe and controls various components of the assembly line grow pod 100. To reduce the processing load, for example, processing the master recipe and all related events for a a large number of simultaneously operating carts carrying the diverse population of plants, the master controller 106 may distribute different and specific functions to several control modules, such as a valve controller, a dosage controller, a pump controller, etc. These control modules work autonomously, complete task(s) and report to the master controller 106. In some embodiments, the control modules may be configured as hardware modules with their own set of instructions in order to improve stability and avoid pushed updates and modifications. In other embodiments, other configurations of the control modules are available.

Figure 2:
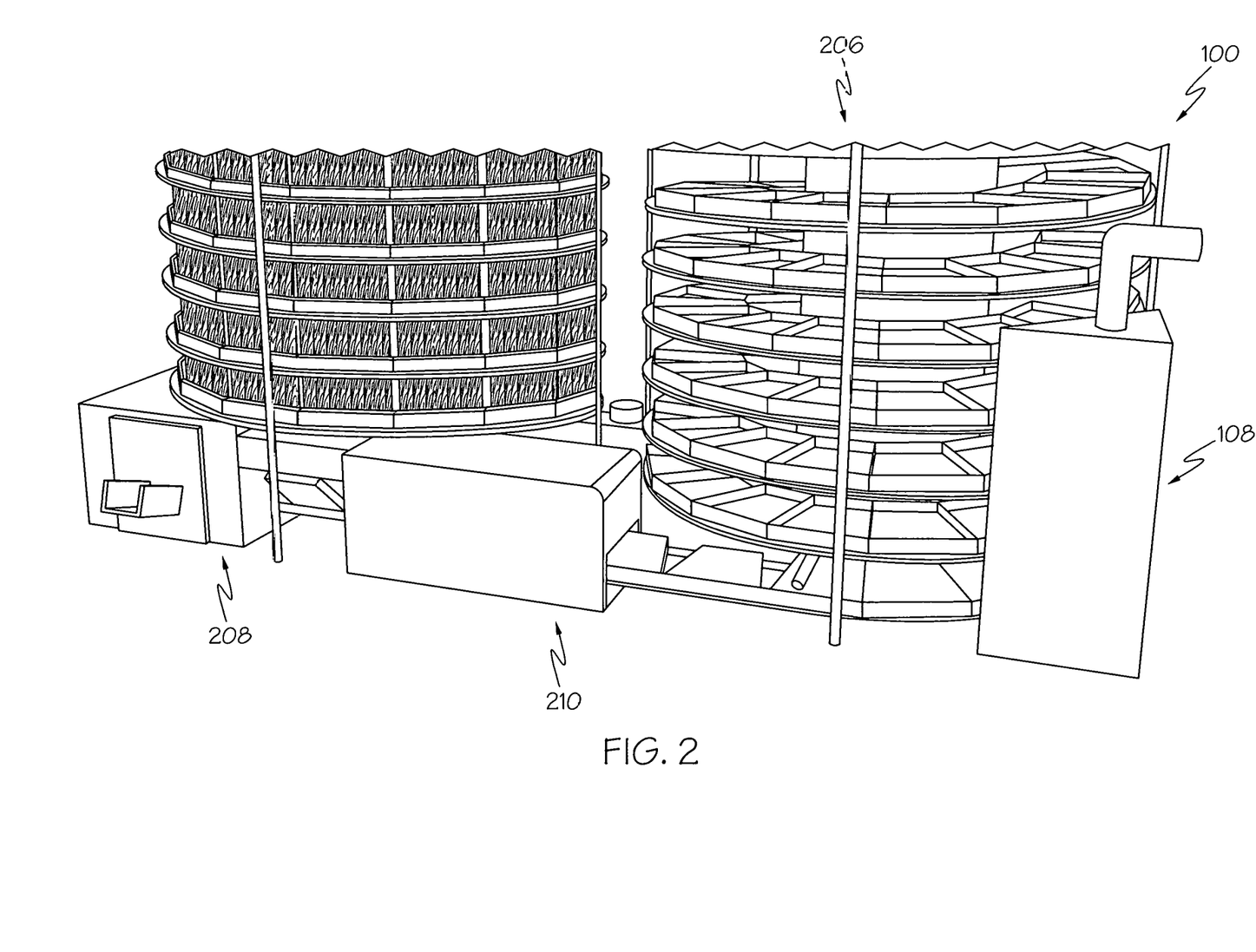
FIG. 2 depicts a seeder component in a grow pod for seed tracking, according to embodiments described herein.

Coupled to the master controller 106 is a seeder component 108, as shown in FIG. 2. The seeder component 108 may be configured to seed one or more carts 104 as the carts 104 pass the seeder in the assembly line. Depending on the particular embodiment, each cart 104 may include a single section tray for receiving a plurality of seeds. Some embodiments may include a multiple section tray for receiving individual seeds in each section (or cell). In the embodiments with a single section tray, the seeder component 108 may detect presence of the respective cart 104 and may begin laying seed across an area of the single section tray. The seed may be laid out according to a desired depth of seed, a desired number of seeds, a desired surface area of seeds, and/or according to other criteria. In some embodiments, the seeds may be pre-treated with nutrients and/or anti-buoyancy agents (such as water) as these embodiments may not utilize soil to grow the seeds and thus might need to be submerged.

In the embodiments where a multiple section tray is utilized with one or more of the carts 104, the seeder component 108 may be configured to individually insert seeds into one or more of the cells. Again, the seeds may be distributed on the tray (or into individual cells) according to a desired number of seeds, a desired area the seeds should cover, a desired depth of seeds, etc.

The watering component may be coupled to one or more water lines 110, which distribute water and/or nutrients to one or more trays at predetermined areas of the grow pod 100. In some embodiments, seeds may be sprayed with water or other liquid to reduce buoyancy and then flooded. Additionally, water usage and consumption may be Monitored, such that at subsequent watering stations, this data may be utilized to determine an amount of water to apply to a seed at that time.

Also depicted in FIG. 1 are airflow lines 112. Specifically, the master controller 106 may include and/or be coupled to one or more components that delivers airflow for temperature control, pressure, carbon dioxide control, oxygen control, nitrogen control, etc. Accordingly, the airflow lines 112 may distribute the airflow at predetermined areas in the assembly line grow pod 100.

Additionally, the assembly line grow pod 100 may include one or more output sensors for monitoring environmental conditions of the assembly line grow pod 100. In some embodiments, the output sensors monitor light that a plant receives, light absorbed by a plant, water received by a plant, water absorbed by a plant, nutrients received by a plant, water absorbed by a plant, environmental conditions provided to a plant, and/or other system outputs. Depending on the particular type of output data being monitored, the output sensors may include cameras, light sensors, color sensors, proximity sensors, sound sensors, moisture sensors, heat sensors, etc. Similarly, in some embodiments, growth sensors may be included in the assembly line grow pod 100, which may include sensors to determine height of a plant, width (or girth) of a plant, fruit output of a plant, root growth of a plant, weight of a plant, etc. As such, the growth sensors may include cameras, weight sensors, proximity sensors, color sensors, light sensors, etc.

The assembly line grow pod 100 further include seed sensors which may include cameras, weight sensors, proximity sensors, etc. to determine a position of the seed in the cart 104 and/or a position of a cart 104 on the assembly line grow pod 100. These types of seed sensors may include transmitters/and/or receivers to facilitate communication with the cart. In some embodiments, the seen sensors may be implemented with image sensors, light sensors, weight sensors, etc. In other embodiments, different types of sensors are available to determine the position of the seed in the cart and the position of the cart.

Figure 6:
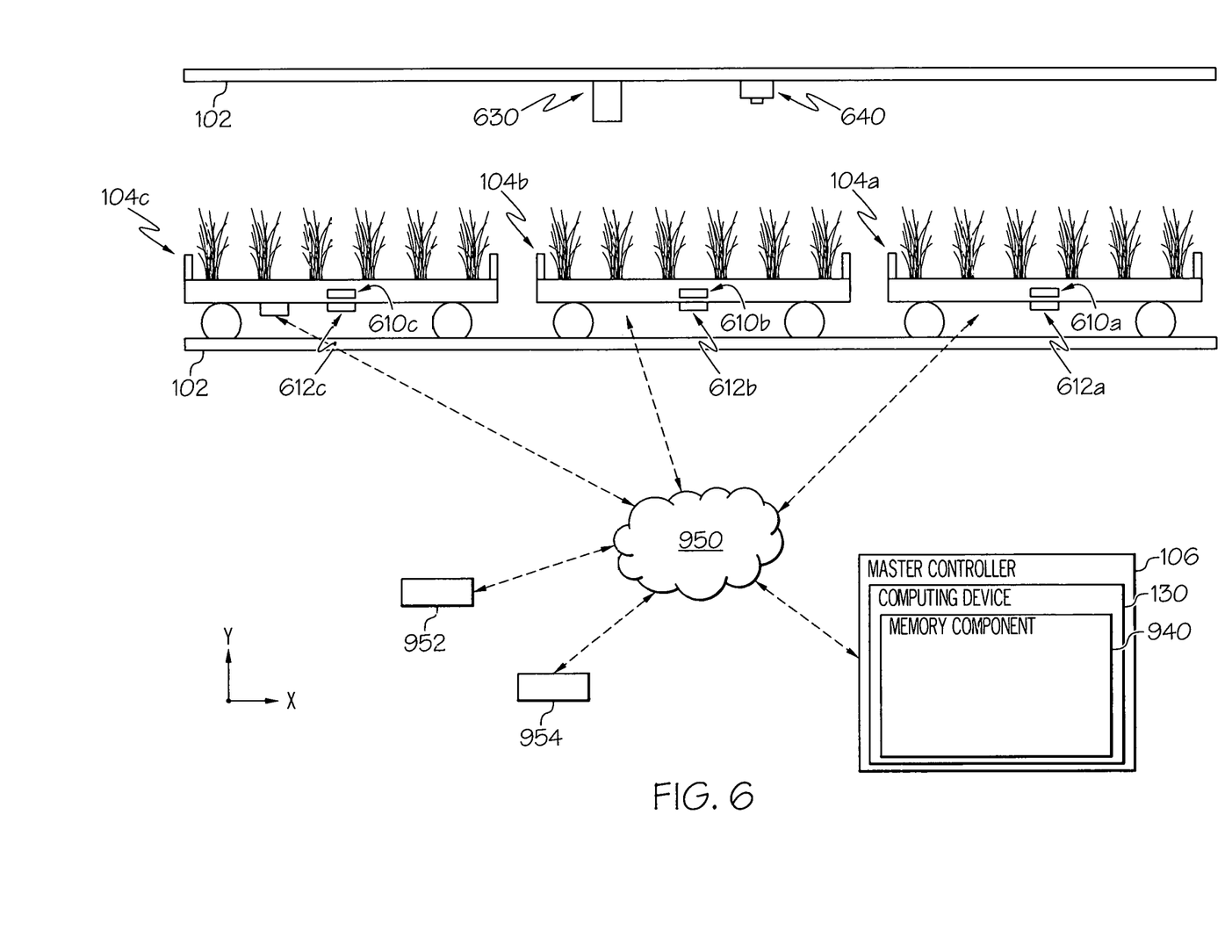
FIG. 6 depicts seed sensors for tracking a position of a particular seed and a cart, according to embodiments described herein.

In some embodiments, the output sensors, the growth sensors and the seed sensors may be implemented with separate and independent groups of sensors. In other embodiments, there may be some overlap and some sensors may provide data relevant to the growth sensors, the seed sensors, or the output sensors. For instance, weight sensors may operate as both seed sensors and growth sensors. As another example, the proximity sensors may work as both seed sensors and the growth sensors. As further another example, light sensors may operate as both growth sensors and output sensors. Selection and arrangement of sensors may have different configurations and combinations based on multiple factors, such as type of plants or seeds in the assembly line grow pod, particular growth patterns of plants, shape and/or size of plants and seeds, structural aspects of the assembly line grow pod, etc. By way of example, arrangements of growth sensors and output sensors may be similar to arrangement of seed sensors as illustrated in FIG. 6, which arranges sensors on the carts, trays, tracks, structures above the carts, etc.

It should be understood that while the embodiment of FIG. 1 depicts an assembly line grow pod 100 that wraps around a plurality of axes, this is merely one example. FIGS. 1 and 2 illustrate a two towers structure of the assembly line grow pod 100, but in other embodiments, a four towers structure is available. In addition, any configuration of assembly line or stationary grow pod may be utilized for performing the functionality described herein.

FIG. 2 depicts a seeder component 108 in the assembly line grow pod 100 for seed tracking, according to embodiments described herein. The seeder component 108 includes a seeder head (not shown) which may facilitate seeding of the tray as the cart 104 passes. It should be understood that while the seeder head may include an arm that spreads a layer of seed across a width of the tray, this is merely an example. Some embodiments may be configured with a seeder head that is capable of placing individual seeds into individual cells of a tray, as described in more detail, below. As illustrated in FIG. 2, the sanitizer component 210 may return the tray to the growing position, which is substantially parallel to ground.

Figure 3:
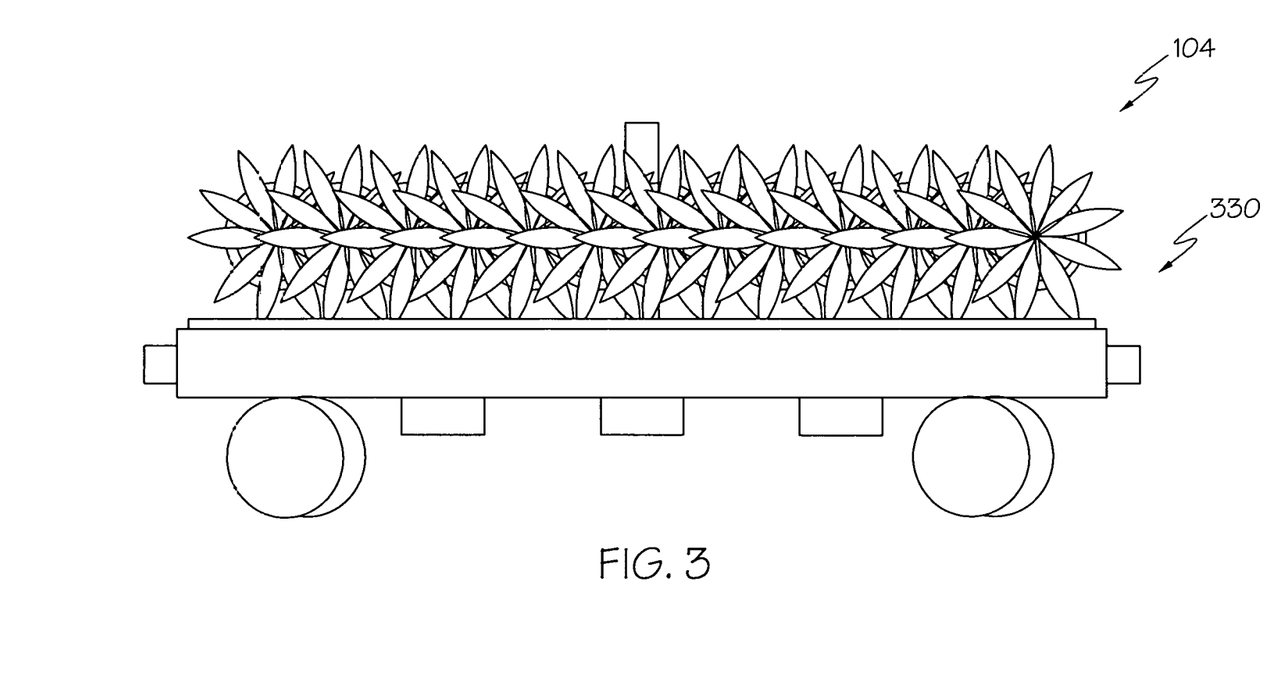
FIG. 3 depicts a cart that may be utilized in an assembly line grow pod, according to embodiments described herein.

FIG. 3 depicts one embodiment of the cart 104 that may be utilized in an assembly line grow pod 100. As illustrated, the cart 104 may include a tray 330 that includes one or more cells. In some embodiments, the tray 330 may be rotatable on the cart 104 such that plants may be easily dumped in mass and the tray easily cleaned. Regardless, the cart 104 may be configured to traverse an assembly line track 102 to receive sustenance, such a light (e.g., from light emitting diodes (LEDs)), water, nutrients, and/or environmental factors, such as temperature control, airflow control, pressure control, sound control, etc. In some embodiments, the cart 104 may be rectangular and/or may be other shape to more easily traverse the track 102. As an example, in embodiments where substantial portions of the track 102 are curved in a single direction (e.g., always turning left), the cart 104 may be shaped with one side that is different than another side to accommodate for this configuration. In other embodiments, the cart 104 and the tray 330 may have different shape and/or size and are not limited to the configurations disclosed in FIGS. 3 and 5.

Figure 4:
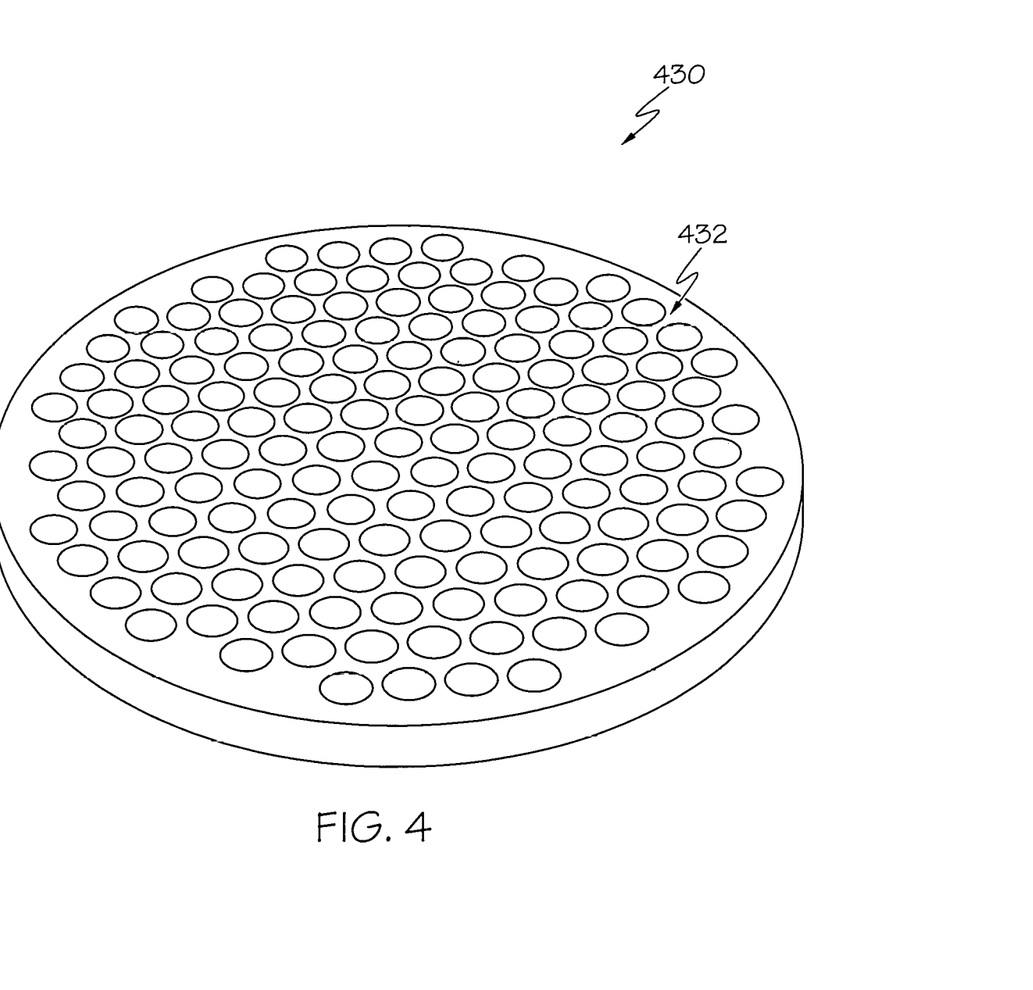
FIG. 4 depicts a circular tray that may be used for seed tracking, according to embodiments described herein.

FIG. 4 depicts a tray 430 that may be used for seed tracking, according to embodiments described herein. As illustrated, one embodiment of a tray 430 may be circular with cells 432 that have a circular cross section. As will be understood, the size and shape of tray 430 may depend on the shape of cart 104, the type of plants, and/or other factors. Additionally, the size, shape, and spacing of the cells 432 may be configured based on the type of plants, the size of the tray 430, the size of the cart 104, and/or other factors.

While the cells 432 have a circular cross section, this is also just an example. Some embodiments of cells may have a cylindrical shape, a cylindrical shape with a rounded base, a triangular cross section, a pyramidal shape, and/or other shape, depending on the particular seed being deposited into the cell and/or other factors. Specifically, larger seeds may require larger cells 432. Similarly, some embodiments may be configured to deposit a plurality of seeds into one cell. Thus, these embodiments may include larger and/or differently shaped cells 432. Similarly, based on the expected root growth, the cells may be spaced apart more or less to provide conditions for the optimal growth.

Figure 5:
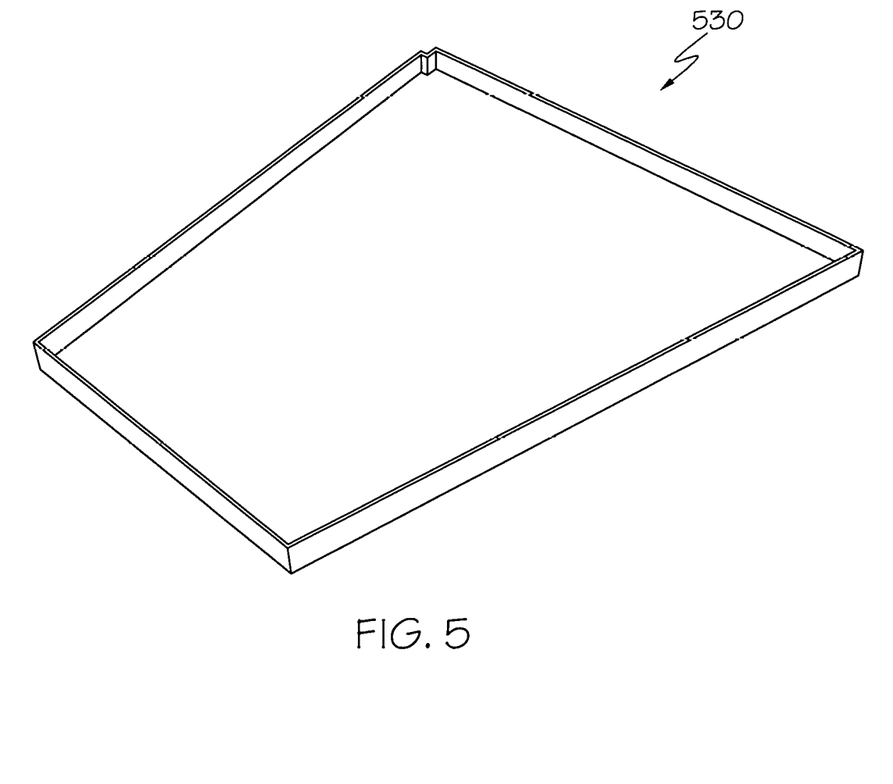
FIG. 5 depicts a trapezoidal tray that may be used for seed tracking, according to embodiments described herein.

FIG. 5 depicts a tray 530 that may be used for seed tracking, according to embodiments described herein. As illustrated, the tray 530 may include a trapezoidal shape and/or other shape to accommodate the cart 104, the track 102, and/or the seeds. While the tray 430 from FIG. 4 is depicted as having a plurality of cells 432, the tray 530 may include a single section (or cell). As such, the seeds may be deposited into the single section (or single cell) and tracked via a camera or other seed sensor, such that if a seed moves within the tray, this movement may be tracked. It should also be understood that embodiments may be configured with the tray 530 including a plurality of cells in a multi-section configuration.

FIG. 6 depicts seed sensors for determining a position of a particular seed and the cart 104 in the assembly line grow pod 100. As discussed above, the seed sensors are arranged to determine the position of the particular seed in the cart 104 and the position of a cart 104 on the assembly line grow pod 100. In some embodiments, the seed sensors may include weight sensors 610, proximity sensors 630, and cameras 640. In other embodiments, the seed sensors may be implemented with other type of sensors. As shown in FIG. 6, carts 104a, 104b, and 104c move along the track 102 in +x direction. While the track 102 is illustrated as a straight track in FIG. 6, the track 102 may be a curved track. The carts 104a, 104b, and 104c include weight sensors 610a, 610b, and 610c, respectively. The weight sensors 610a, 610b, and 610c are configured to measure the weight of a payload on the carts, such as plants. The carts 104a, 104b, and 104c also include cart computing devices 612a, 612b, and 612c, respectively. The cart computing devices 612a, 612b, and 612c may be communicatively coupled to the weight sensors 610a, 610b, and 610c and receive weight information from the weight sensors 610a, 610b, and 610c. The cart computing devices 612a, 612b, and 612c may have wireless network interface for communicating with the master controller 106 through a network 950. In some embodiments, each of the carts 104a, 104b, and 104c may include a plurality of weight sensors. The plurality of weight sensors may determine weights of individual cells or plants on the carts. In other embodiments, a plurality of weight sensors may be placed on the track 102.

The plurality of weight sensors may determine weights of individual cells or plants on the carts. When seeds and/or plants are placed in the individual cells, the weight sensors may measure the weights of seeds and/or plants in each cell, which may be translated into a particular location of seeds and/or plants on the tray, such as the tray 430 and 530 as shown in FIGS. 4 and 5. The weight sensors 610a, 610b, and 610c are configured to measure the weights of the carts on the track 102 and transmit the weights to the master controller 106. The master controller 106 may determine the weight of plants on a cart by subtracting the weight of the cart from the weight received from the weight sensors on the track 102.

The proximity sensor 630 may be positioned over the carts 104a, 104b, and 104c. In embodiments, the proximity sensor 630 may be attached under the track 102. The proximity sensor 630 may be configured to detect a distance between the proximity sensor 630 and the plants. For example, the proximity sensor 630 may transmit waves and receive waves reflected from seeds, plants, or both in a selected cell 432. Based on the travelling time of the waves, the proximity sensor 630 may determine the distance between the proximity sensor and the plants. In some embodiments, the proximity sensor 630 may be configured to detect an object within a certain distance. For example, the proximity sensor 630 may detect the seeds and/or plants in the carts 104b if the plants are within a certain distance (e.g., 5 inches) from the proximity sensor 630. The proximity sensor 630 may have wireless network interface for communicating with the master controller 106 through a network 650 as shown in FIG. 6.

The camera 640 may be positioned over the carts 104a, 104b, and 104c. In embodiments, the camera 640 may be attached under the track 102. The camera 640 may be configured to capture an image of the seeds and/or plants in connection with the selected cells in the cart 104b. This image may be translated into a particular location of seeds and/or plants on the tray. This image may be further translated into identification of a particular cart on the track 102 of the assembly line grow pod 100. The camera 640 may have a wide angle lens to capture plants of more than one cart 104. For example, the camera 640 may capture the images of the plants in the carts 104a, 104b, and 104c. The camera 640 may include a special filter that filters out artificial LED lights from lighting devices in the assembly line grow pod 100 such that the camera 640 may capture the natural colors of the plants. The camera 640 may have wireless network interface for communicating with the master controller 106 through the network 650 (FIG. 6).

As discussed above, there may be some overlap and some sensors may provide data relevant to the growth sensors, the seed sensors, or the output sensors. For instance, the weight sensors 610a, 610b, and 610c may operate as both the seed sensors and the growth sensors. As another example, the proximity sensor 630 may work as both the seed sensors and the growth sensors.

Figure 7:
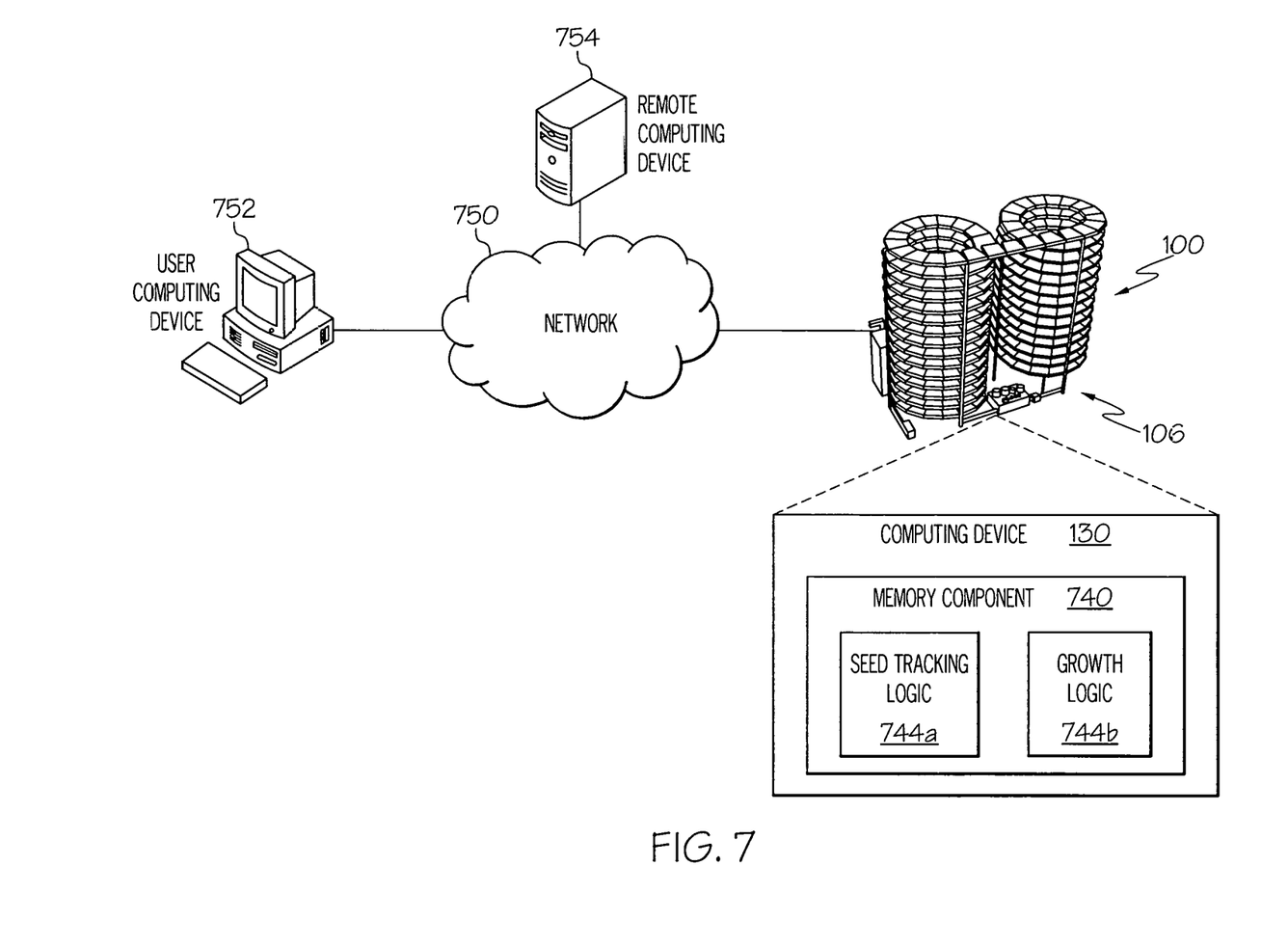
FIG. 7 depicts a computing environment for seed tracking in a grow pod, according to embodiments described herein.

FIG. 7 depicts a computing environment for seed tracking in the assembly line grow pod 100, according to embodiments described herein. As illustrated, the assembly line grow pod 100 may include the master controller 106, which may be implemented with a computing device 130. The computing device 130 may include a memory component 740, which stores seed tracking logic 744a and growth logic 744b. As described in more detail below, the seed tracking logic 744a may determine the location of a seed in a cart 104 and on the assembly line grow pod 100. The tracking may be according to a predetermined address and/or other mechanism. Similarly, the growth logic 744b may be configured to determine the sustenance that is to be provided to each cell, as well as monitor the plant growth. The sustenance may be provided according to a predetermined schedule and/or as monitored by the grow pod 100 and adjusted, as necessary.

Additionally, the assembly line grow pod 100 is coupled to a network 750. The network 750 may include the internet or other wide area network, a local network, such as a local area network, a near field network, such as Bluetooth or a near field communication (NFC) network. The network 750 is also coupled to a user computing device 752 and/or a remote computing device 754.

The user computing device 752 may include a personal computer, laptop, mobile device, tablet, server, etc. and may be utilized as an interface with a user. As an example, a user may send a command to determine the current, historical, and/or future location of a particular seed/plant. Another example may include the grow pod 100 sending notifications to a user of the user computing device 752 regarding tracking of a particular seed or plant.

Similarly, the remote computing device 754 may include a server, personal computer, tablet, mobile device, etc. and may be utilized for machine to machine communications. As an example, if the assembly line grow pod 100 may communicate with the remote computing device for additional tracking statistics, growth statistic, etc. of a particular seed, plant, type of seed, or type of plant.

Figure 8:
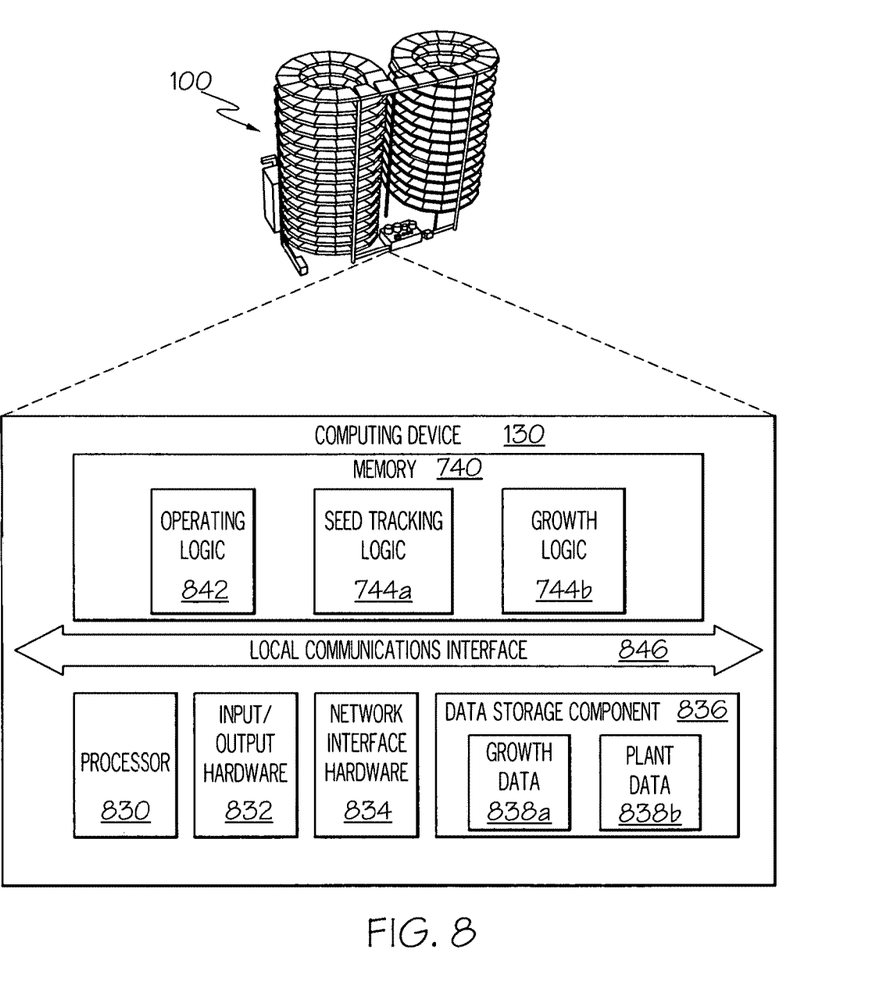
FIG. 8 depicts a computing device for seed tracking in a grow pod, according to embodiments described herein.

FIG. 8 depicts another embodiment of the computing device 130 configured as a specific control module for tracking seeds in the assembly line grow pod 100, according to embodiments described herein. As discussed above, FIG. 7 depicts the embodiment where the master controller 106 may be implemented with the computer device 130. In some embodiments, the control module 130 may be inserted into a modular control interface of the master controller 106 to perform the function of tracking seeds. In some embodiments, the control module 130 may be removably inserted into the modular control interface of the master controller 106. As illustrated, the computing device 130 includes a processor 830, input/output hardware 832, network interface hardware 834, a data storage component 836 (which stores growth data 838a, plant data 838b, and/or other data), and the memory component 740. The memory component 740 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the computing device 730 and/or external to the computing device 730.

The memory component 740 may store operating logic 842, the seed tracking logic 744a, and the growth logic 744b. The seed tracking logic 744a and the growth logic 744b may each include a plurality of different pieces of logic, each of which may be embodied as a computer program, firmware, and/or hardware, as an example. A local interface 846 is also included in FIG. 8 and may be implemented as a bus or other communication interface to facilitate communication among the components of the computing device 730.

The processor 830 may include any processing component operable to receive and execute instructions (such as from a data storage component 836 and/or the memory component 740). The input/output hardware 832 may include and/or be configured to interface with microphones, speakers, a display, and/or other hardware.

The network interface hardware 834 may include and/or be configured for communicating with any wired or wireless networking hardware, including an antenna, a modem, LAN port, wireless fidelity (Wi-Fi) card, WiMax card, ZigBee card, Bluetooth chip, USB card, mobile communications hardware, and/or other hardware for communicating with other networks and/or devices. From this connection, communication may be facilitated between the computing device 730 and other computing devices, such as a computing device on a remote grow pod, the user computing device 752, and/or remote computing device 754.

The operating logic 842 may include an operating system and/or other software for managing components of the computing device 730. As also discussed above, seed tracking logic 744a and the growth logic 744b may reside in the memory component 740 and may be configured to perform the functionality, as described herein.

It should be understood that while the components in FIG. 8 are illustrated as residing within the computing device 730, this is merely an example. In some embodiments, one or more of the components may reside external to the computing device 730. It should also be understood that, while the computing device 730 is illustrated as a single device, this is also merely an example. In some embodiments, the seed tracking logic 744a and the growth logic 744b may reside on different computing devices. As an example, one or more of the functionalities and/or components described herein may be provided by the user computing device 752 and/or remote computing device 754.

Additionally, while the computing device 730 is illustrated with the seed tracking logic 744a and the growth logic 744b as separate logical components, this is also an example. In some embodiments, a single piece of logic (and/or or several linked modules) may cause the computing device 730 to provide the described functionality.

Figure 9:
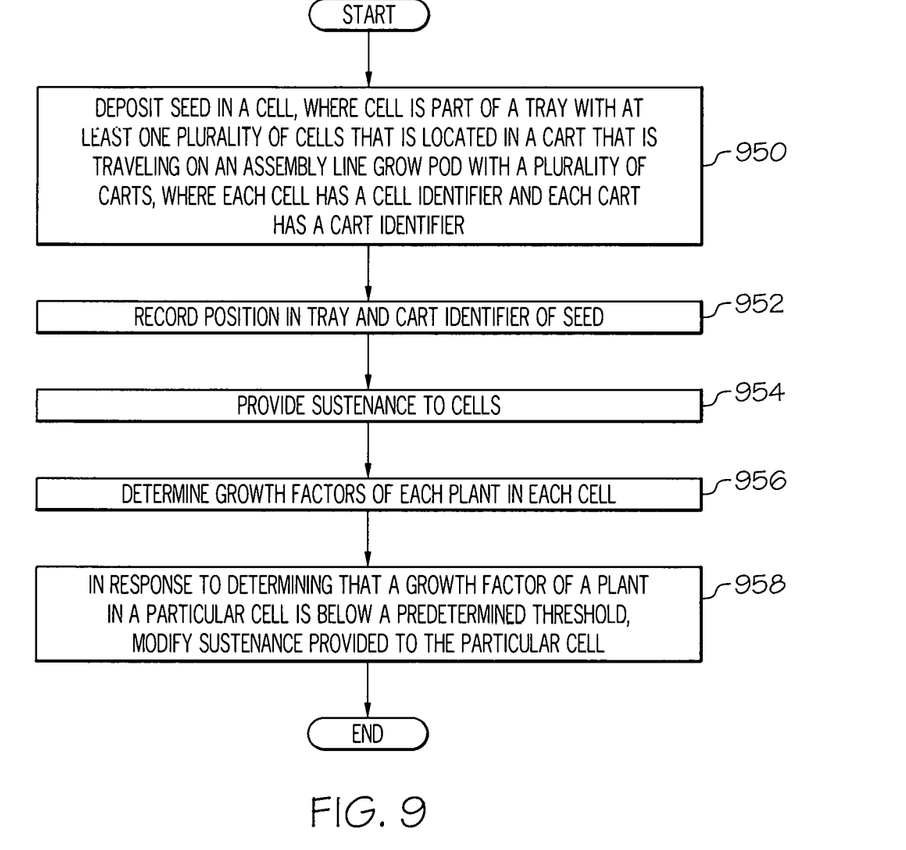
FIG. 9 depicts a flowchart for seed tracking in a grow pod, according to embodiments described herein.

FIG. 9 depicts a flowchart for seed tracking process implemented in the seed tracking logic 744a as shown in FIGS. 7 and 8, according to embodiments described herein. As illustrated in block 950, a seed may be deposited in a cell. As discussed above, the cell is part of a tray with a plurality of cells that is located, as shown in FIG. 4. The tray is arranged on the cart 104b that is traveling on the assembly line grow pod 100 with other carts 104a and 104c. In this embodiment, each cell has a cell identifier and each cart 104 has a cart identifier (block 950). In block 952, a position of a particular seed (i.e., a target seed) in the tray and a cart identifier carrying the particular seed may be recorded. As discussed above, the seed sensors are arranged to determine the position of the particular seed in the cart 104 and a position of a cart 104 on the assembly line grow pod 100 with the cart identifier. In some embodiments, the seed sensors may include cameras 640, weight sensors 612a, 612b, 612c, and proximity sensors 630, as shown in FIG. 6. In other embodiments, the seed sensors may be implemented with other type of sensors.

As discussed above in connection with FIG. 6, the seed sensors determine the position of the particular seed (target seed) in the selected cell and the particular cart by obtaining an image of the seed and/or the cart with the camera 640, measuring the weight of individual cells with the weight sensors 610a, 610b, 610c, and detecting the seed with the proximity sensor 630. The weight sensors 610a, 610b, 610c may determine the position of seeds when seeds move in the selected cell(s) and cause changes in the weight. Additionally, or alternatively, the proximity sensor 630 may detect the movement of the target seed, and the camera 640 also may provide the changed images as the particular seed moves in the selected cell(s).

Once the position of the particular seed is identified in the selected cell and the particular cart, such information may be provided to the master controller 106. Then, the master controller 106 may identify the particular seed and retrieve relevant plant recipe of the particular seed, which includes relevant sustenance information as to a light (e.g., from light emitting diodes (LEDs)), water, nutrients, and/or environmental factors, such as temperature control, airflow control, pressure control, sound control, etc.

In block 954, sustenance relevant to the particular seed may be provided to the selected cell on the tray arranged on the particular cart. In block 956, growth factors for each plant in each cell may be determined. As discussed above, the growth sensors may include sensors to determine height of a plant, width (or girth) of a plant, fruit output of a plant, root growth of a plant, weight of a plant, etc. Determining the growth factors with the growth sensors is discussed here to the extent that is needed to describe the embodiments of the present disclosure. Detailed descriptions of determining the growth factors by the growth sensors are found in U.S. Provisional Application No. 62/519,660, entitled "SYSTEMS AND METHODS FOR MEASURING GROWTH OF A PLANT IN A GROW POD," which is incorporated herein by its entirety.

In block 958, in response to determining that the growth factor of a plant in a particular cell is below a predetermined threshold, sustenance may be provided to the particular cell. As discussed above, the growth sensors may be included in the assembly line grow pod 100 to detect and determine height of a plant, width (or girth) of a plant, fruit output of a plant, root growth of a plant, weight of a plant, etc. Accordingly, if the growth factors of a plant growing out of the particular seed in the selected cell are below the predetermined threshold, the master controller 106 may determine whether the amount and/or a value of sustenance should be adjusted. For example, if height of a plant may be measured to be lower than an average height for a plant, the master controller 106 may determine whether more nutrient and water should be supplied. In another example, if height of a plant may be measured to be too high with reference to an average value, or threshold, the master controller 106 may determine whether water and/or nutrients should be reduced or adjusted differently.

As illustrated above, various embodiments for seed tracking are disclosed. These embodiments allow for the care of individual seeds in an assembly line grow pod. With the seed sensors, the position of the particular seed in the selected cell and the particular cart carrying the particular are identified and recorded. The master controller 106 assigns a seed identifier and a cart identifier to the particular seed and the particular cart. Then, the master controller retrieves relevant sustenance information to the particular seed and controls and instructs relevant components to provide sustenance based on the relevant sustenance information to the particular cart. This not only increases the output of each plant, but may also be utilized to identify successes and failures of various dosages and uses of plant sustenance for future use. As the particular seed and the particular cart may be identified and tracked, and sustenance is provided in response to the particular seed, individual care and customized handling of seeds and/or plants can be provided. Tracking the identification of the particular seed and the particular cart may be further used to adjust sustenance based on the growth factor and the growth condition of the identified particular seed. Also, sustenance may be provided to the particular cart where the particular seed is identified and tracked.

As such, embodiments described herein include the system and/or method for seed tracking in a grow pod that include a plurality of carts that are each disposed on a track of the grow pod, where the each cart includes a cell for receiving a seed; a seed sensor that that determines a position of a seed at a predetermined position in the grow pod; a growth sensor the receives data related to growth of the seed; and a computing device that receives data from the seed sensor data and the growth sensor to determine a position and growth of the seed in the grow pod; and initiating a change is sustenance provided to the seed to alter the growth of the seed.

In another embodiment, tracking the position of the target seed further includes tracking the position of the target seed with a seed sensor that determines the position of the target seed. The step of tracking the position of the target seed further includes, when the target seed moves within the selected tray, tracking movement of the target seed with the seed sensor.

In another embodiment, the method for tracking seeds further includes (i) assigning a cart identifier to each cart; (ii) assigning a cell identifier to each selected cell; and (iii) recording the cart identifier and the cell identifier in a memory. The method for tracking seeds further includes determining an expected root growth to the target seed and the step of depositing the target seed in the selected cell further includes depositing the target seed to be spaced apart from a neighboring seed based on the expected root growth. The step of determining the growth factor of the target seed further includes determining the growth factor of the target seed with a plurality of growth sensors arranged in the assembly line grow pod.

In another embodiment, the step of determining the growth factor of the target seed with the growth sensors further includes: (i) transmitting a first signal from the growth sensors to the selected cart; and (ii) receiving a second signal from the selected cart at the growth sensors.

In another embodiment, movement of the target seed is tracked with the seed sensor that determines the position of the target seed. The seed sensor further comprises a camera, a weight sensor, a proximity sensor, or a combination thereof. The growth sensors further comprise a camera, a light sensor, a color sensor, a proximity sensor, a sound sensor, a moisture sensor, a heat sensor, or a combination thereof. With the growth sensors, height, width, fruit output, root growth and weight of a target plant growing out of the target seed may be determined in the selected cell.

In another embodiment, size and shape of the tray depend on shape of the selected cart and size, shape, and spacing of the selected cell. In another embodiment, the position of the target seed is tracked by using the cell identifier and the cart identifier as an address. In another embodiment, the tray includes the selected cell as a single cell. Upon determination that the growth factor of the target cell is below the predetermined threshold, the selected tray moves the first position of the target seed within the single cell. When the target seed is moved within the single cell, movement of the target seed is tracked with the seed sensor.

In another embodiment, the tray includes a plurality of cells including the selected cell and the size and spacing of each cell are determined at least based on expected root growth and size of a target plant growing out of the target seed.

As discussed, the system and/or method for seed tracking in a grow pod are specifically for use with the assembly line grow pod. The assembly line grow pod of the present disclosure may provide an organized plant grow pod system which facilitates a quick growing, small footprint, chemical free, low labor solution to growing microgreens and other plants for harvesting. At the same time, the assembly line grow pod may provide controlled environmental conditions (e.g., the timing and wavelength of light, pressure, temperature, watering, nutrients, molecular atmosphere, and/or other variables) and ensure that each plant or seed receives customized and selective care based on individual growth factors and parameters relevant to plants or seeds, in order to optimize plant growth and output. The assembly line grow pod of the present disclosure includes a plurality of output sensors that senses and monitors various environmental conditions such as light that a plant receives, light absorbed by a plant, water received by a plant, water absorbed by a plant, nutrients received by a plant, water absorbed by a plant, and/or other system outputs.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein include systems, methods, and non-transitory computer-readable mediums for tracking seeds in an assembly line grow pod. It should also be understood that these embodiments are merely exemplary and are not intended to limit the scope of this disclosure.

What is claimed is:

1. A method for tracking seeds in an assembly line grow pod having a plurality of carts, comprising:
    depositing a target seed in a selected cell which is a part of a tray located in a selected cart travelling on an assembly line grow pod;
    tracking a position of the target seed in the selected cell by determining the position of the target seed in the selected cart and determining a position of the selected cart in the assembly line grow pod;
    providing sustenance to the target seed including the selected cell;
    determining a growth factor of the target seed in the selected cell; and
    upon determination that the growth factor of the target seed in the selected cell is below a predetermined threshold, adjusting supply of the sustenance provided to the selected cell and moving the target seed to a different position within the selected cell.

2. The method of claim 1, wherein tracking the position of the target seed further comprises tracking the position of the target seed with a seed sensor that determines the position of the target seed.

3. The method of claim 2, wherein tracking the position of the target seed further comprises, when the target seed moves within the selected tray, tracking movement of the target seed with the seed sensor.

4. The method of claim 2, further comprising:
    assigning a cart identifier to each cart;
    assigning a cell identifier to each selected cell; and
    recording the cart identifier and the cell identifier in a memory.

5. The method of claim 1, further comprising determining an expected root growth to the target seed, wherein depositing the target seed in the selected cell further comprises depositing the target seed to be spaced apart from a neighboring seed based on the expected root growth.

6. The method of claim 1, wherein determining the growth factor of the target seed further comprises determining the growth factor of the target seed with a plurality of growth sensors arranged in the assembly line grow pod.

7. The method of claim 6, wherein determining the growth factor of the target seed with the growth sensors further comprises:
    transmitting a first signal from the growth sensors to the selected cart; and
    receiving a second signal from the selected cart at the growth sensors.

8. A system for tracking seeds in an assembly line grow pod, comprising:
    a plurality of carts travelling on a continuous track of an assembly line grow pod;
    a tray located on a selected cart and including a selected cell where a target seed is deposited;
    a seed sensor arranged to communicate with the selected cart and detect a position of the target seed and the selected cart;
    a plurality of growth sensors arranged to communicate with the selected cart and measure data relevant to growth of the target seed; and
    a master controller in communication with the seed sensor and the growth sensors and including a processor and a memory for storing programs, wherein the programs, upon execution by the processor, cause operations comprising:
        determining a first position of the target seed and a second position of the selected cart based on first data received from the seed sensor;
        identifying the target seed and retrieving plant growth information relevant to the target seed;
        providing sustenance relevant to the target seed based on the plant growth information to the selected cell;
        determining a growth factor of the target seed in the selected cell based on second data received from the plurality of growth sensors; and
        upon determination that the growth factor of a target cell is below a predetermined threshold, adjusting an amount of sustenance provided to the target seed based on the growth factor of the target seed and causing movement of the target seed from the first position into a different area of the target cell.

9. The system of claim 8, wherein the seed sensor further comprises a camera, a weight sensor, a proximity sensor, or a combination thereof.

10. The system of claim 9, wherein the growth sensors further comprise a camera, a light sensor, a color sensor, a proximity sensor, a sound sensor, a moisture sensor, a heat sensor, or a combination thereof.

11. The system of claim 10, wherein the programs, upon execution by the processor, cause operations further comprising:
    determining, with the growth sensors, height, width, fruit output, root growth and weight of a target plant growing out of the target seed in the selected cell.

12. The system of claim 8, wherein size and shape of the tray depend on shape of the selected cart and size, shape, and spacing of the selected cell.

13. The system of claim 8, wherein the programs, upon execution by the processor, cause operations further comprising:
    assigning a cell identifier and a cart identifier to the selected cell and the selected cart; and
    recording the first position of the target seed in the tray and the cart identifier in the memory.

14. The system of claim 13, wherein the programs, upon execution by the processor, cause operations further comprising:
tracking the first position of the target seed by using the cell identifier and the cart identifier as an address.

15. A system for tracking seeds in an assembly line grow pod, comprising:
a tray located on a selected cart and including a selected cell where a target seed is deposited;
a seed sensor arranged to sense first data relating to a second position of the selected cart and a first position of the target seed;
a plurality of growth sensors arranged to sense second data relating to growth factors of the target seed;
a plurality of output sensors arranged to sense environment factors relevant to growth of plants; and
a master controller in communication with the seed sensor, the growth sensors and the output sensors and including a processor and a memory for storing programs, wherein the programs, upon execution by the processor, perform operations comprising:
determining the first position of the target seed and the second position of the selected cart based on first data received from the seed sensor;
identifying the target seed and retrieving plant growth information relevant to the target seed;
providing sustenance relevant to the target seed based on the plant growth information to the selected cell;
determining a growth factor of the target seed in the selected cell based on second data received from the plurality of growth sensors; and
upon determination that the growth factor of a target cell is below a predetermined threshold, causing movement of the target seed from the first position of the target seed to another position within the selected cell.

16. The system of claim 15, wherein the programs, upon execution by the processor, cause operations further comprising:
tracking movement of the target seed with the seed sensor that determines the first position of the target seed.

17. The system of claim 15, wherein the programs, upon execution by the processor, cause operations further comprising:
assigning a cell identifier and a cart identifier to the selected cell and the selected cart; and
recording the first position of the target seed in the tray and the cart identifier in the memory.

18. The system of claim 17, wherein the programs, upon execution by the processor, cause operations further comprising:
tracking movement of the target seed by using the cell identifier and the cart identifier as an address.

19. The system of claim 15, wherein the tray includes the selected cell as a single cell and wherein the programs, upon execution by the processor, perform operations further comprising:
upon determination that the growth factor of the target cell is below the predetermined threshold, causing the selected tray to move the first position of the target seed to a different location within the single cell; and
when the target seed is moved to the different location within the single cell, tracking movement of the target seed with the seed sensor.

20. The system of claim 15, wherein the tray includes a plurality of cells including the selected cell and the size and spacing of each cell are determined at least based on expected root growth and size of a target plant growing out of the target seed.

* * * * *